United States Patent [19]

Yevick

[11] 4,114,168
[45] Sep. 12, 1978

[54] FILM STRIP RECORDER AND VIEWER

[75] Inventor: George J. Yevick, Leonia, N.J.

[73] Assignee: Izon Corporation, Stamford, Conn.

[21] Appl. No.: 785,039

[22] Filed: Apr. 8, 1977

Related U.S. Application Data

[63] Continuation-in-part of Ser. No. 624,253, Oct. 20, 1975, abandoned.

[51] Int. Cl.$^2$ .............. G02B 5/14; G03B 33/00; G03B 21/26; G03B 27/44
[52] U.S. Cl. .............. 354/102; 350/96.10; 353/34; 353/38; 355/46
[58] Field of Search .............. 353/27 A, 27 R, 34, 353/38; 350/167, 96 B, 96 R; 354/102, 110; 355/45, 46

[56] References Cited

U.S. PATENT DOCUMENTS

| | | | |
|---|---|---|---|
| 3,642,360 | 2/1972 | Ataka | 353/38 |
| 3,704,068 | 11/1972 | Waly | 355/46 |
| 3,712,724 | 1/1973 | Courtney-Pratt | 353/38 X |
| 3,824,609 | 2/1973 | Yevick | 354/102 |
| 3,853,395 | 12/1974 | Yevick | 353/38 X |
| 3,864,034 | 2/1975 | Yevick | 353/38 X |
| 3,865,485 | 2/1975 | Yevick | 354/110 X |
| 3,876,900 | 4/1975 | Amatsuka et al. | 350/96 R |
| 3,941,467 | 3/1976 | Kapany et al. | 353/34 |
| 3,950,094 | 4/1976 | Kano et al. | 355/45 |

OTHER PUBLICATIONS

I.B.M. Technical Disclosure Bulletin, vol. 14, No. 2, 7/1971, Line Illuminator for Back-Lit Display.
The Focal Encyclopedia of Photography, Desk Edition 1960, MacMillan Co., pp. 866 & 867.

*Primary Examiner*—Donald A. Griffin
*Attorney, Agent, or Firm*—Thomas J. Greer, Jr.

[57] ABSTRACT

A compact optical viewer and recorder which employs a Philips-type cassette. Small lenses project microimages from the film strip wound upon the cassette upwardly and onto a plurality of mirrors. The mirrors function to compress the throwing distance of the lenses, the final image appearing on a screen.

21 Claims, 32 Drawing Figures

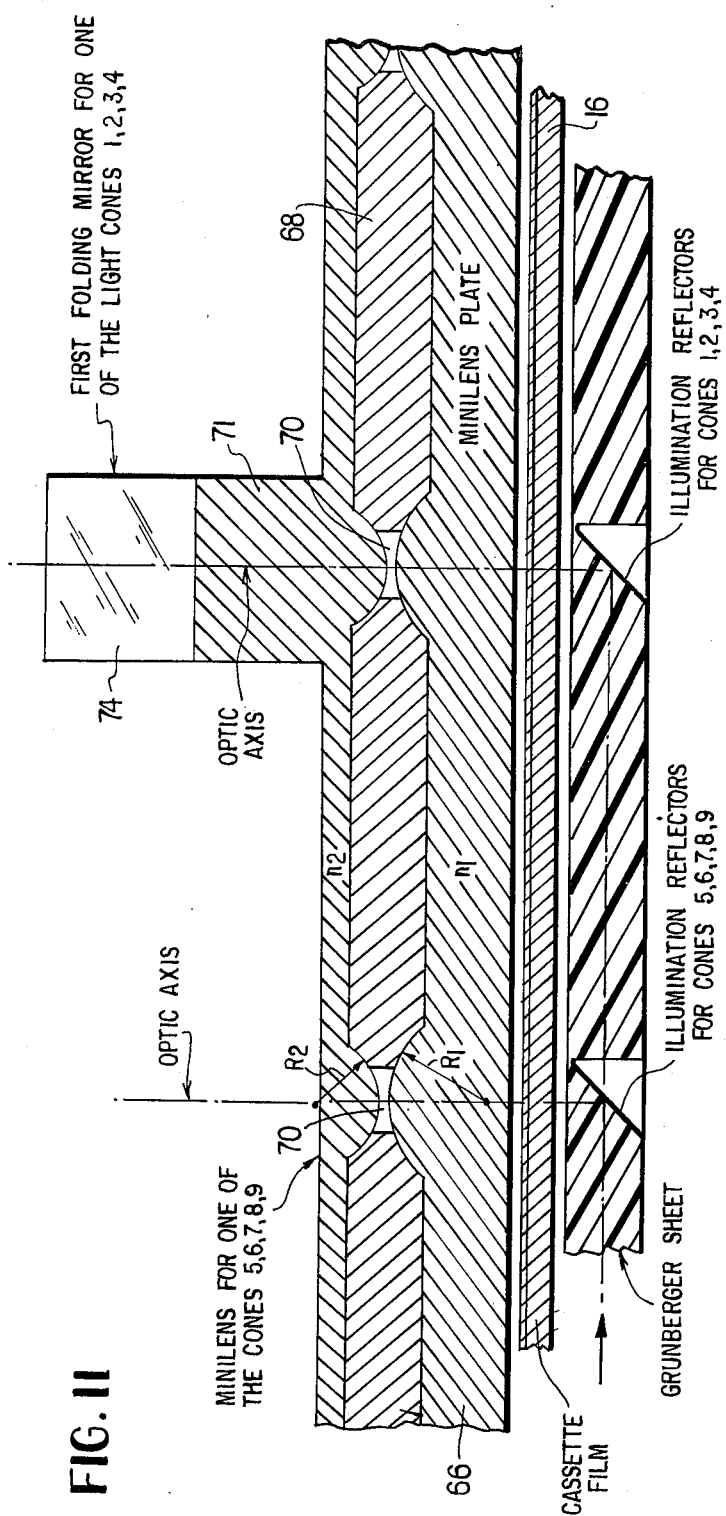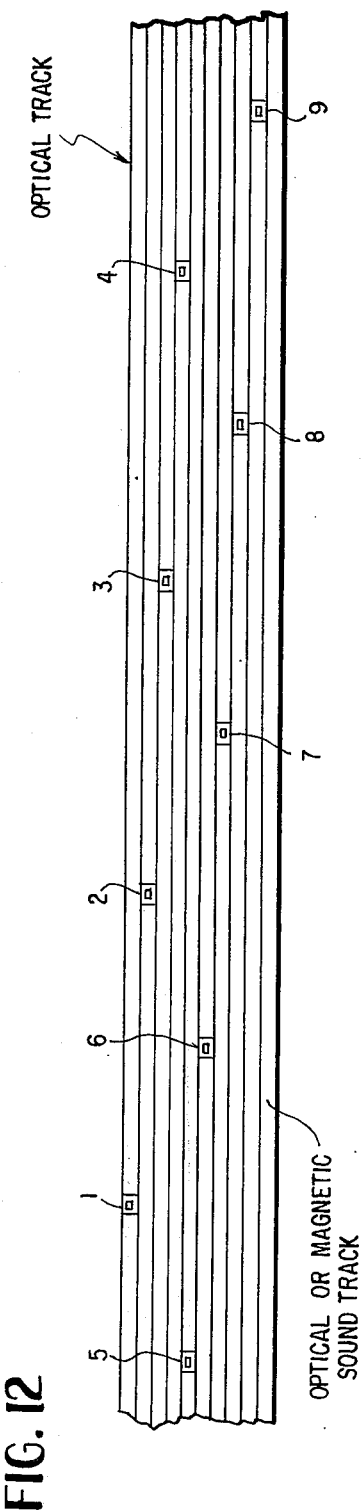

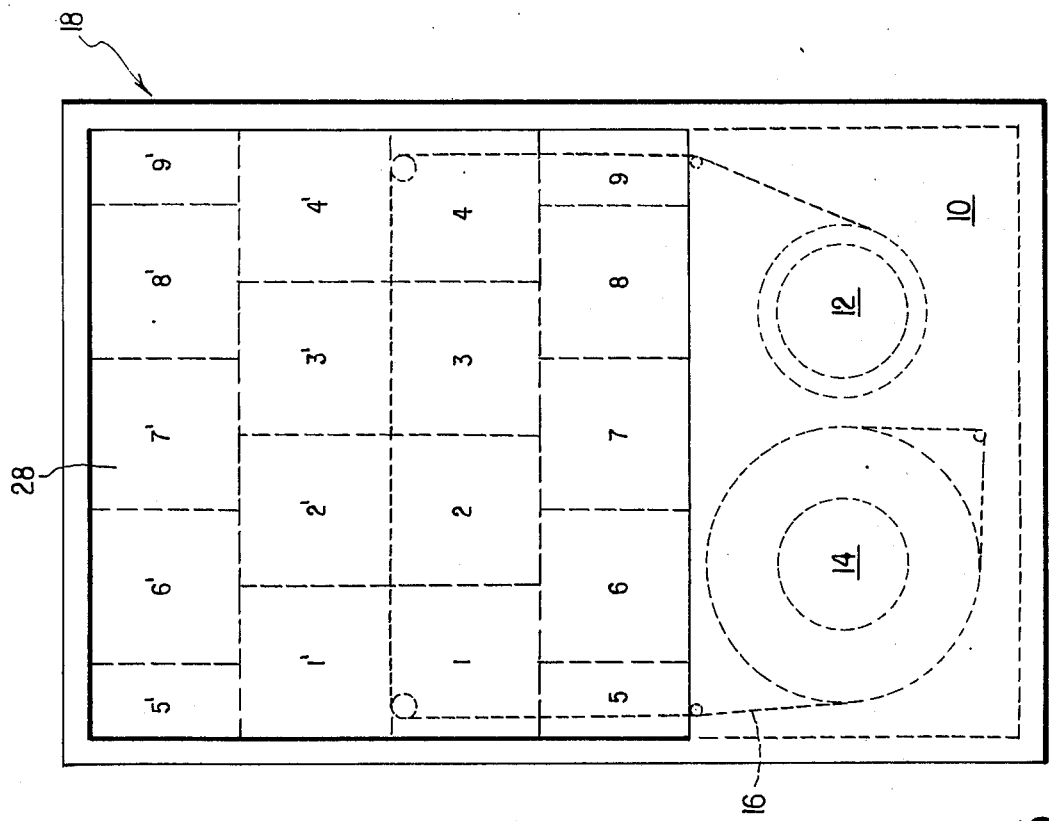
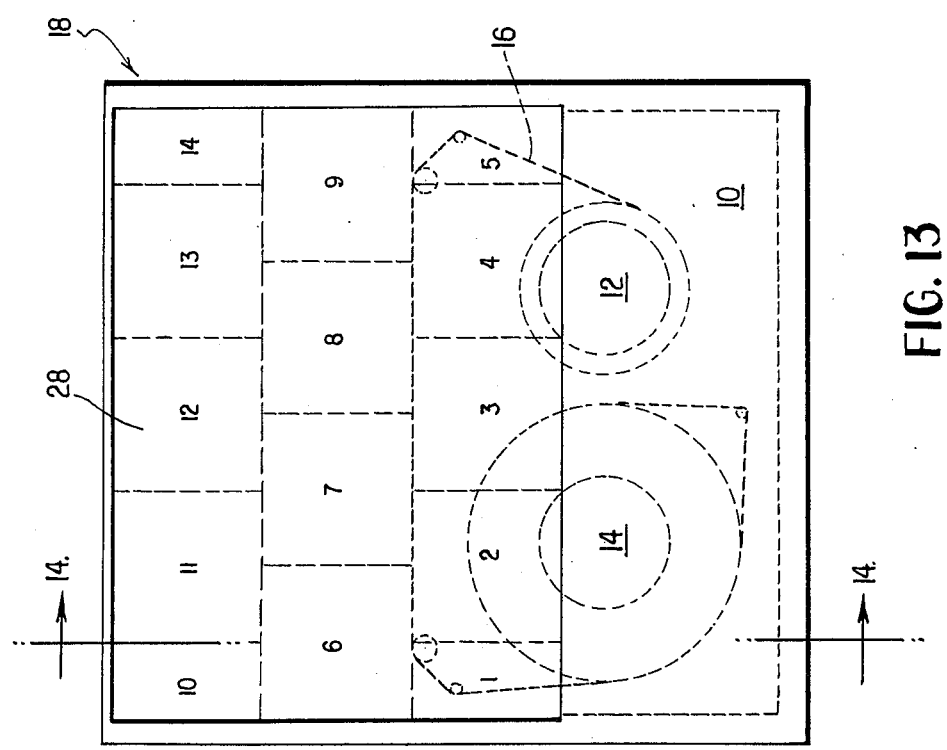
FIG. 15
FIG. 13

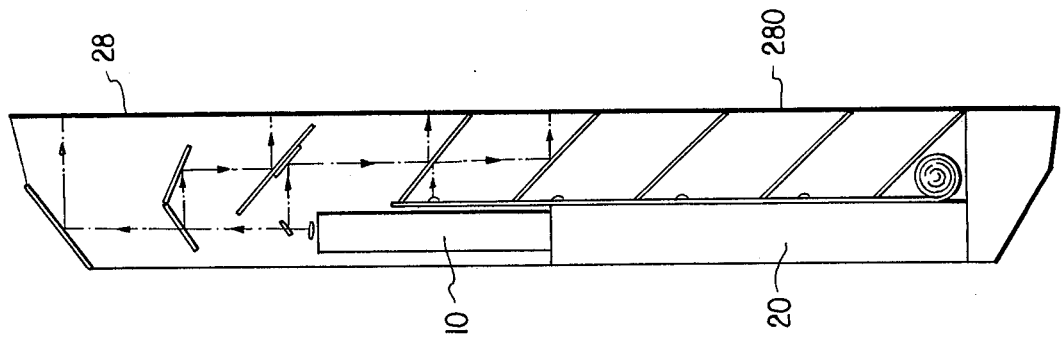
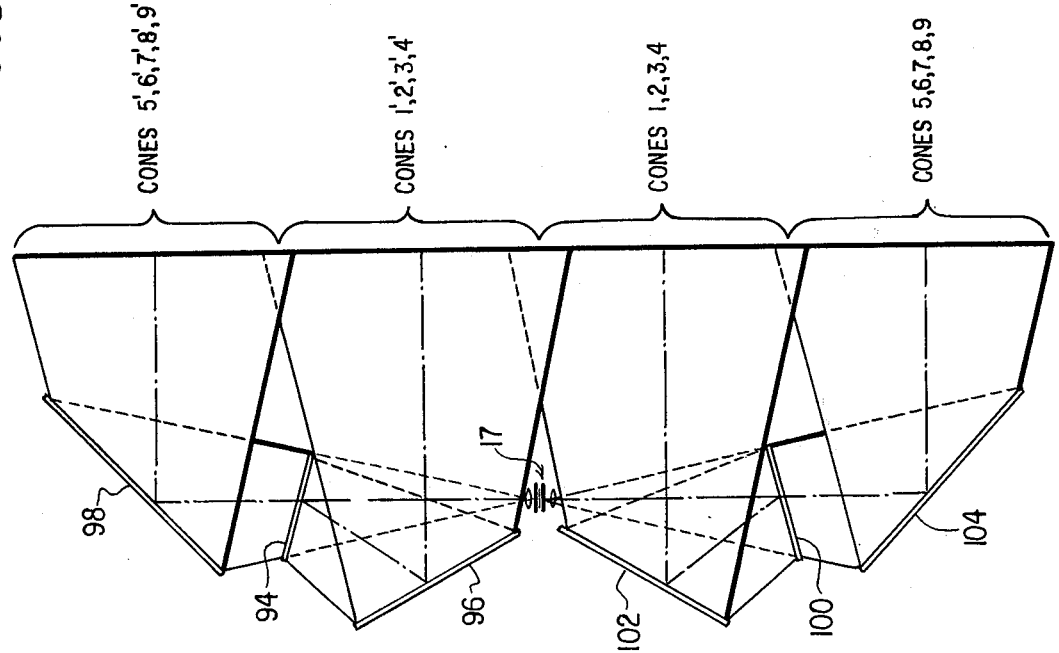

FIG. 22a
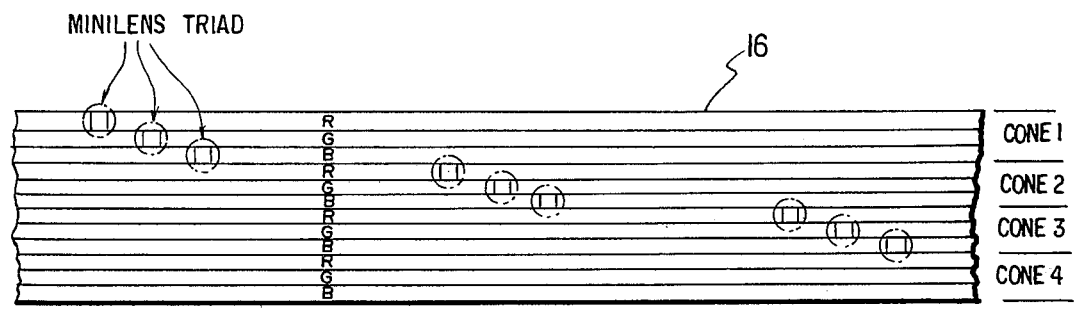
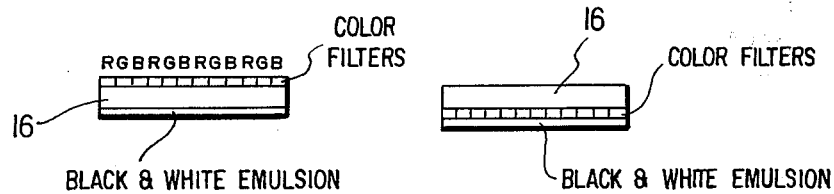
FIG. 22b    FIG. 22c

FILM STRIP RECORDER AND VIEWER

This application is a continuation-in-part application of my co-pending application Ser. No. 624,253, filed Oct. 20, 1975, now abandoned.

This invention relates to a compact micro-film reader employing the film carried by a Philips-type cassette as the recording medium on which microimages are placed and from which these microimages are projected through a plurality of lenses onto a viewing screen.

The use of a large number of small lenses to record and later to view information, to make possible inexpensive compact recording and viewing devices, has been disclosed in U.S. Pat. No. 3,704,068 to Waly. In that patent, intelligence is distributed by a multiplicity of tiny lenses whose positions are fixed with respect to information in the form of microimages interspersed on a microfiche. In my U.S. Pat. Nos. 3,864,034; 3,853,395; 3,865,485; and 3,824,609, modifications of this concept include what is termed a lensfiche. In a lensfiche the information on the photographic film (of a microfiche) is fixed relative to the tiny lenses (lensettes) of the microfiche.

The present invention represents a further modification of the concepts disclosed in the above Waly patent, this modification making possible a more practical realization of compact recording and viewing devices. A variety of such devices will be here described.

For purposes of the following discussion, lenses will be arbitrarily designated as follows. A lens employed in projection and recording devices which is less than 30 mils in radius will be called a microlens. Lenses having a radius between 30 mils and 150 mils will be termed minilenses. Lenses having a radius greater than 150 mils will be termed macrolenses. Reference to Table I will further define the comparison between these three (arbitrary) classes of lenses. The magnification of 30 and index 1.5 are given by way of example.

TABLE I
(All lengths in Mils)
COMPARISON OF DIFFERENT CLASSES OF LENSES

| | Type of Lens | Microlens | Minilens | Macrolens |
|---|---|---|---|---|
| 1. | | | | |
| 2. | Radius of Curvature R | $R<30$ | $30<R<150$ | $150<R$ |
| 3. | Focal Length (Plano- ($\eta=1.5$) f Convex) | $f<60$ | $60<f<300$ | $300<f$ |
| 4. | Throwing Distance S' for magnification 30 | $S'<1800$ | $1800<S'<9000$ | $9000<S'$ |
| 5. | Focal length (double ($\eta=1.5$) f Convex) | $f<30$ | $30<f<150$ | $150<f$ |
| 6. | Throwing Distance S' for Magnification 30 | $S'<900$ | $900<S'<4500$ | $4500<S'$ |
| 7. | Approx. Thickness H of apparatus for straight up projection | $H<1200$ | $1200<H<5000$ | $5000<H$ |

The application of microlenses for the storage and retrieval of information is utilized by means of a lensfiche. Clearly, macro lenses are prohibited because they cannot yield compact storage and retrieval of information. According to the practice of this invention, compact storage and retrieval of information may be economically realized by the use of mini lenses, despite their apparent excessive throwing distances. In accordance with the practice of this invention a throwing distance of the order of one inch may be tolerated by using a multiplicity of mirrors in combination with the lenses. The mirrors are termed folding mirrors for a reason which will become apparent. By the use of mini lenses the advantage of relative ease of fabrication over micro lenses are enjoyed. Further, only relatively few are required to span or accommodate relatively large recording and/or viewing areas. Their use permits substantial manufacturing tolerances to thereby admit of relatively inexpensive, so-called fool-proof manufacturing and use.

According to the practice of this invention, mini lenses are employed in combination with a Philips-type cassette. A Philips-type cassette offers many advantages for recording and reading out of information. The average speed of a film strip in a Philips-type cassette is 1⅞ inches per second. Cassettes run for often as long as 90 minutes which yield a total length of 10,000 inches or 830 feet. This extent is achieved by extreme thinness of the film and the technology of generating durable, thin film for such cassettes is known. It is precisely because of the readily available and accordingly inexpensive production of such cassettes, in combination with their capacity for storing vast amounts of information, which yields the results of this invention. With such a cassette, one is dealing with approximately 1,500 square inches or 10 square feet. This area admits of almost astronomical amounts of information which may be stored. All of these advantages are realized in a hand-held viewer by virtue of this invention.

In my co-pending application Ser. No. 612,862, filed Sept. 12, 1975 and now U.S. Pat. No. 4,060,317 issued Nov. 29, 1977, entitled "Compact Folded Mirror Recorder and Viewer of Information," hereby incorporated by reference, there is disclosed the concept of the use of mini lenses in combination with folding mirrors to reduce the throwing distance of the lenses. This in turn enables one to enjoy viewing devices of the order of magnitude of one inch. The present invention contemplates the use of so-called mini lenses with a Philips-type cassette whereby the advantage of ruggedness, dependability, and storage area of the Philips-type cassette are enjoyed. In the case where the information is stored, in the form of microimages, on a generally rectangular planar sheet (such as in my noted co-pending application Ser. No. 612,862) it is preferable that the viewing screen be parallel to the planar sheet. Clearly, if the viewing screen is at some angle to the planar sheet, the viewing/recording device will be bulky. In the case where the information is stored in a narrow film strip, such as a Philips-type cassette film strip, it is preferable that the viewing screen be at right angles to the plane of the film strip. This construction yields an information storage and retrieval device the size of a hand-held book.

In a typical device constructed in accordance with this invention, the number of such mini lenses may be small. For example, for a viewing screen 3 inches by 4 inches, eight such mini lenses are required. Clearly, the expense of fabricating such a lens array is rather small.

IN THE DRAWINGS

Figure 4B:
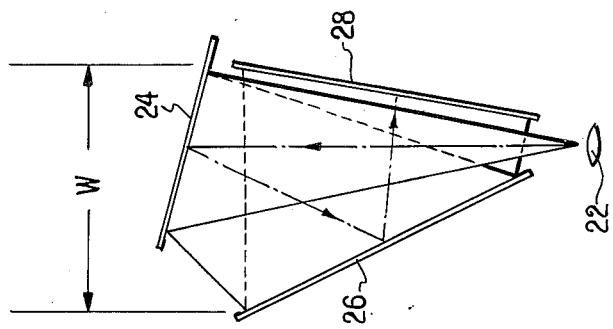
Figure 4A:
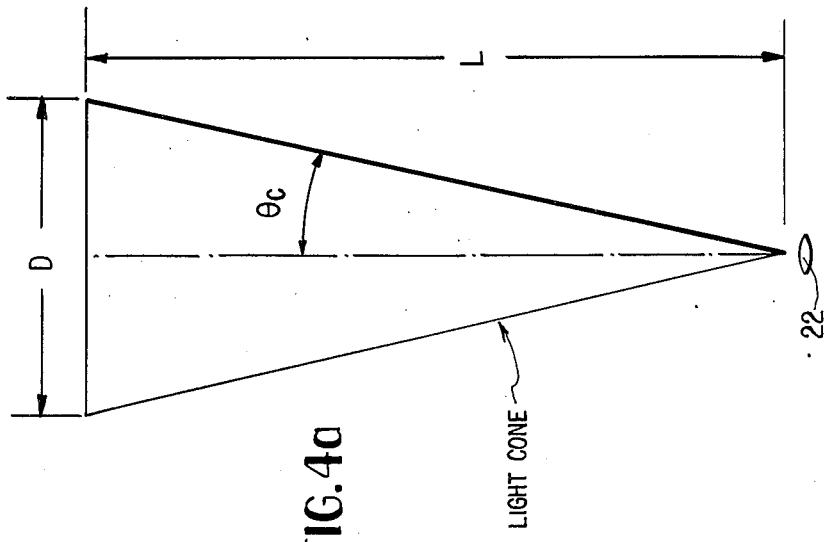

FIGS. 4(a) and 4(b) represent the reduction of throwing distance realized by the use of folding mirrors.

Figure 2:
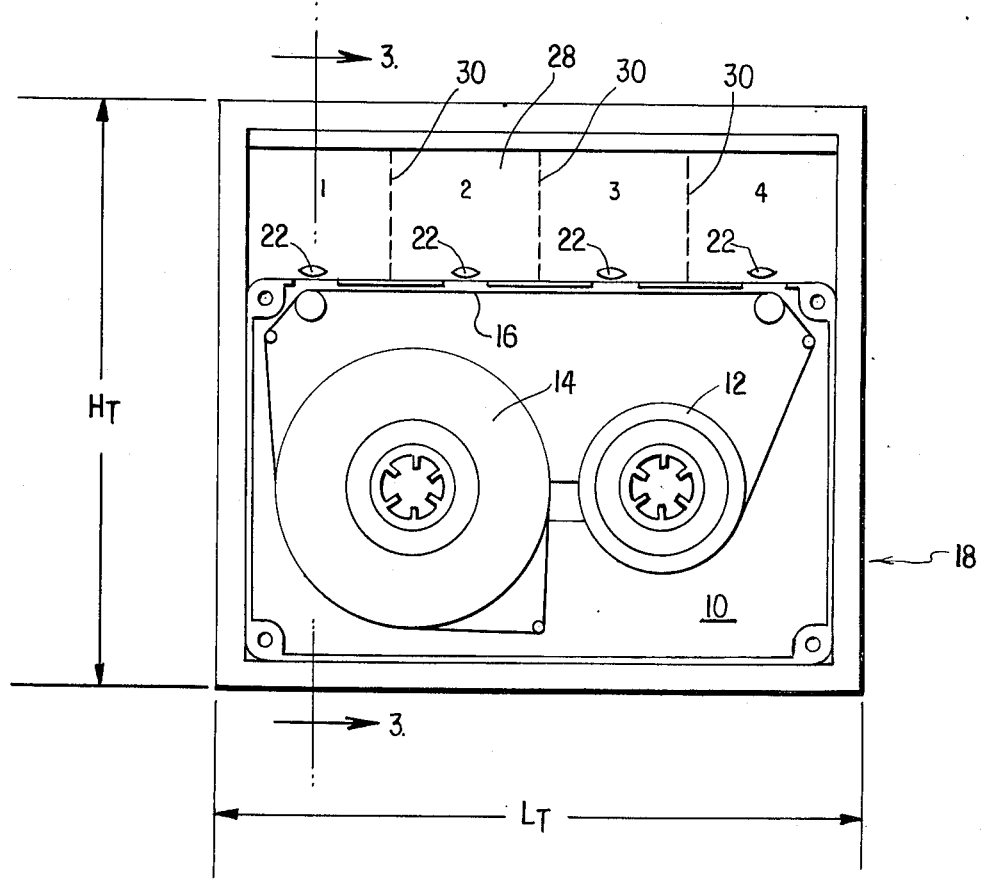
FIG. 2 is an elevational view, partially schematic, illustrating the viewer of this invention which includes a Philips-type cassette.
Figure 5:
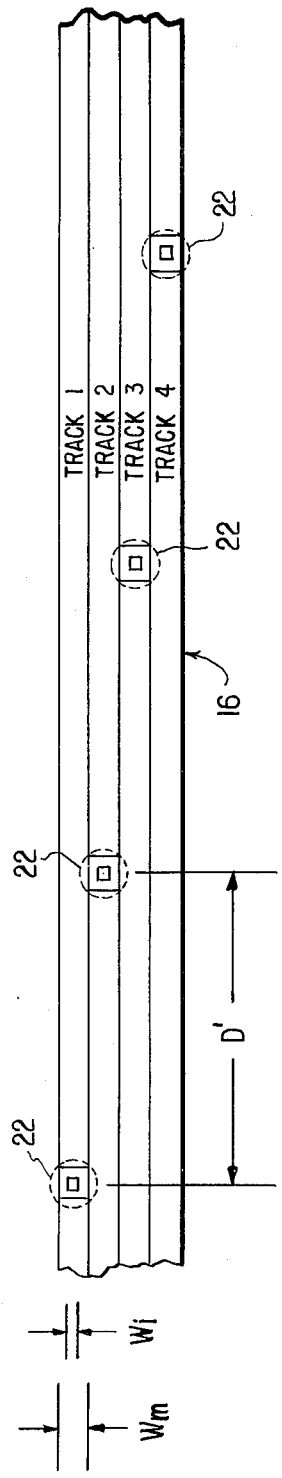

FIG. 5 is a partially schematic view illustrating four optical tracks, each of which are assigned to a respective optical cell of the viewer of FIG. 2.

Figure 6:
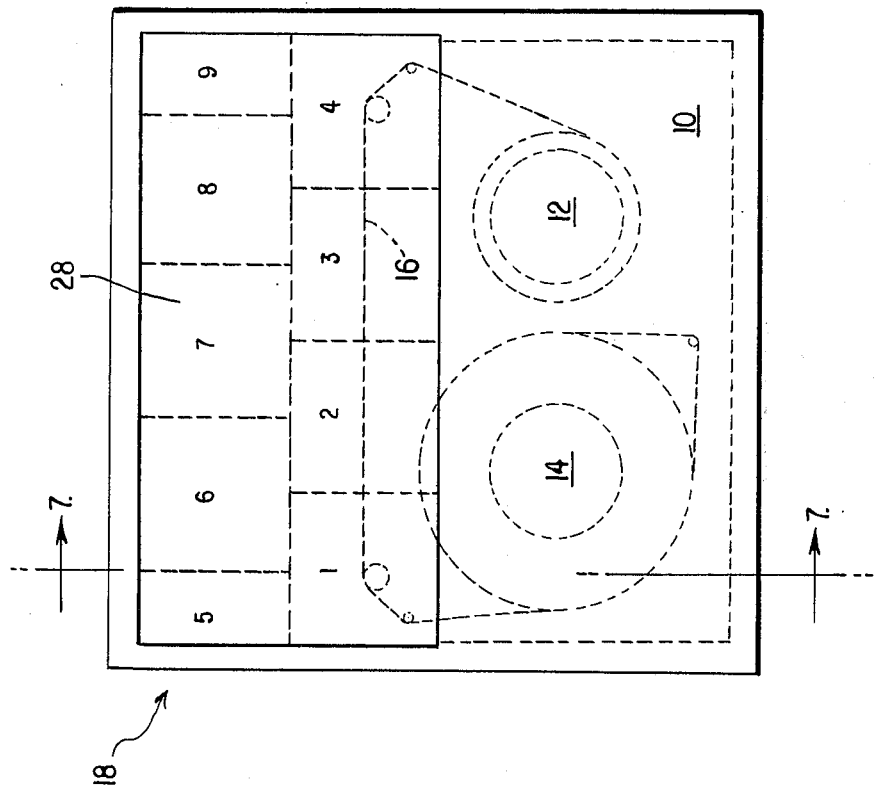

FIG. 6 is a partially schematic elevational view, similar to FIG. 2, and showing a double-tier viewer.

Figure 7:
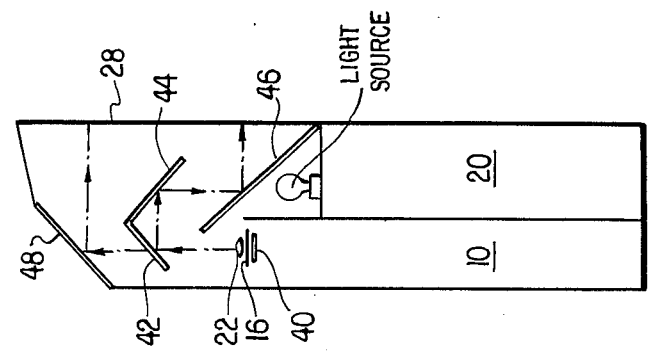

FIG. 7 is a view taken along section 7—7 of FIG. 6.

Figure 8:
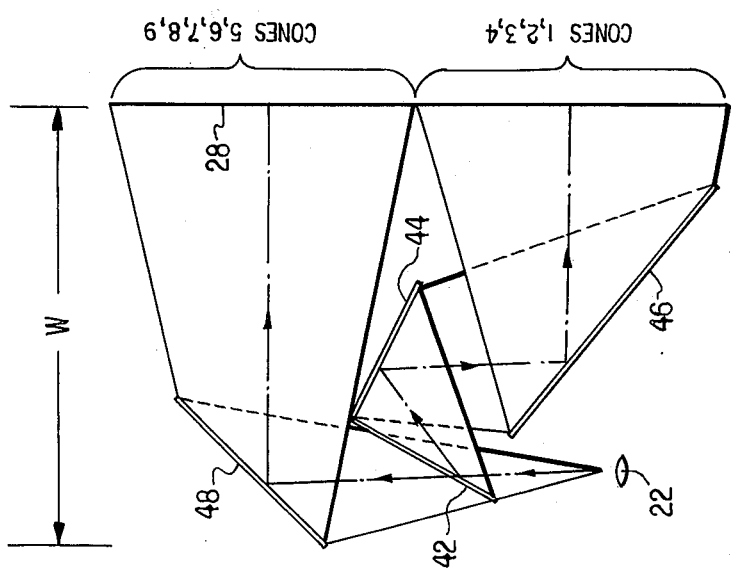

FIG. 8 is an enlarged view of the upper portion of FIG. 7.

Figure 8A:
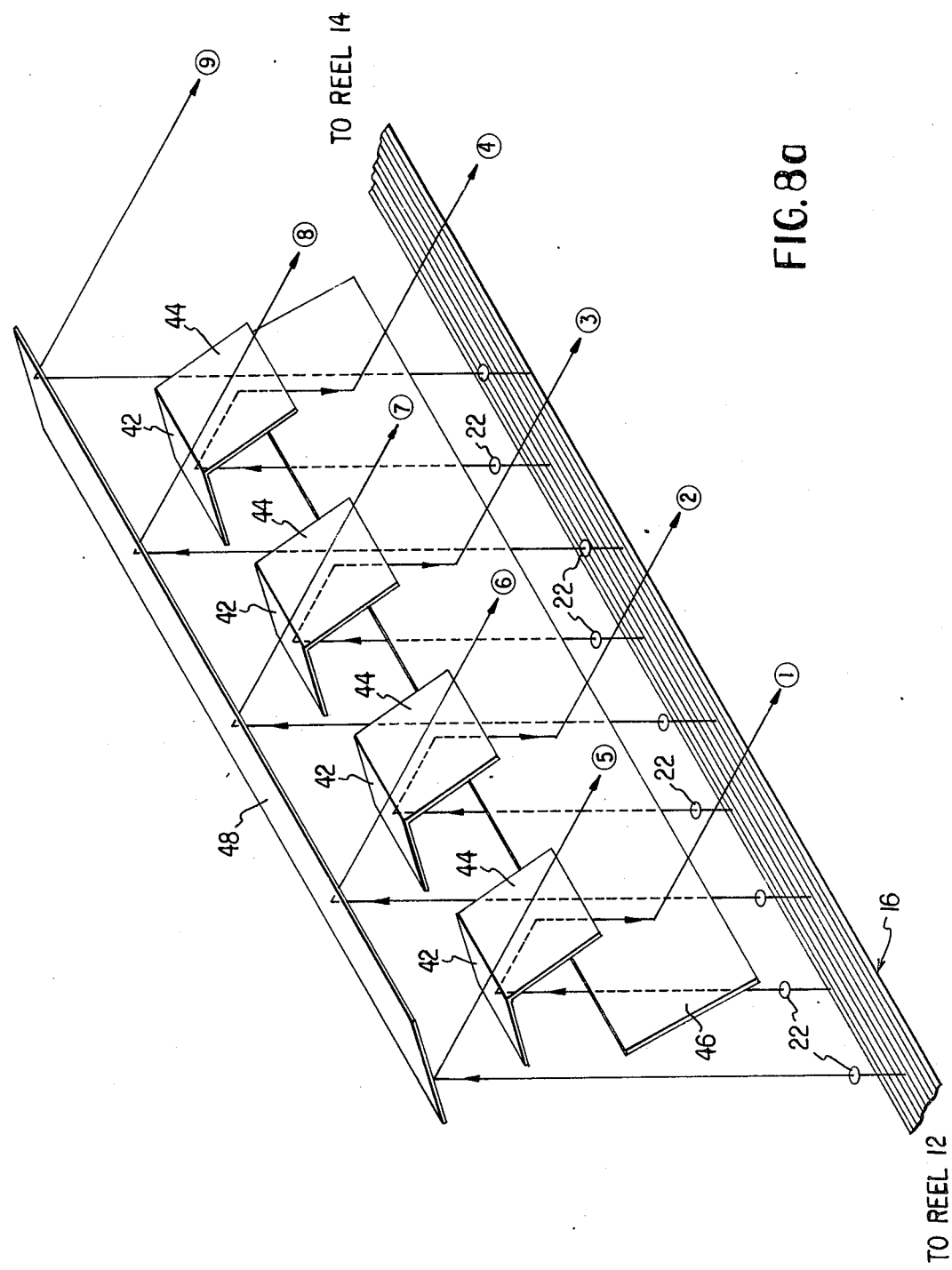

FIG. 8(a) is a partially schematic perspective view of the double-tier viewer of FIGS. 6, 7 and 8.

Figure 9:
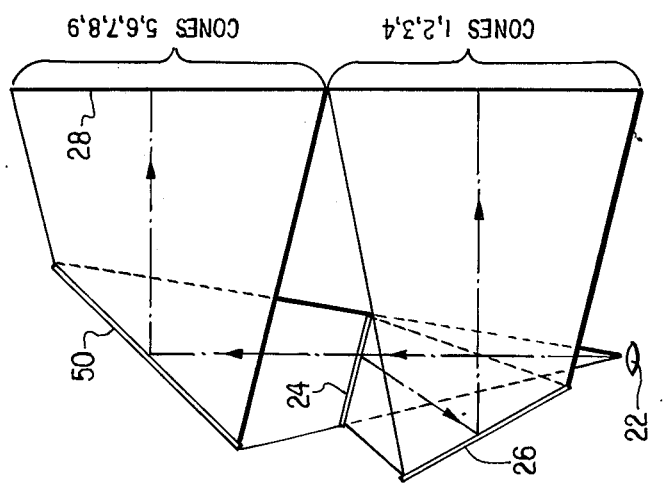

FIG. 9 is a view similar to FIG. 8, showing a modification.

Figure 10:
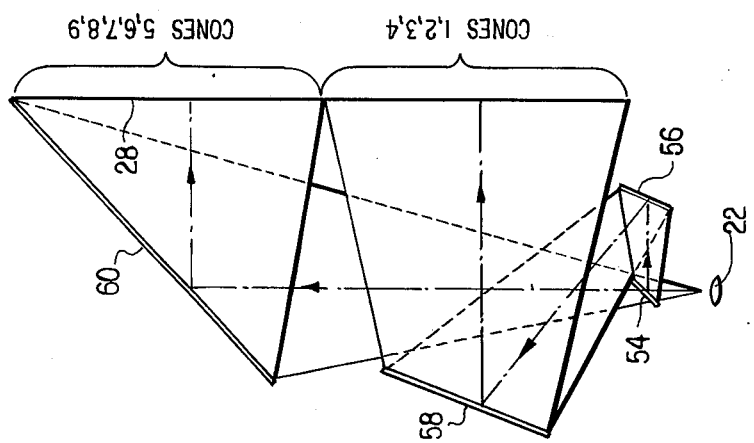

FIG. 10 is a view similar to FIG. 9, showing a further modification.

FIG. 11 is a partially schematic sectional view illustrating a built-in folding mirror arrangement in combination with a plate which carries mini lenses plate.

FIG. 12 is a view similar to FIG. 5 and illustrates optical tracks associated with optical cells of the viewer of FIG. 6.

FIG. 13 is a partially schematic plan view illustrating a three-tier viewer.

Figure 14:
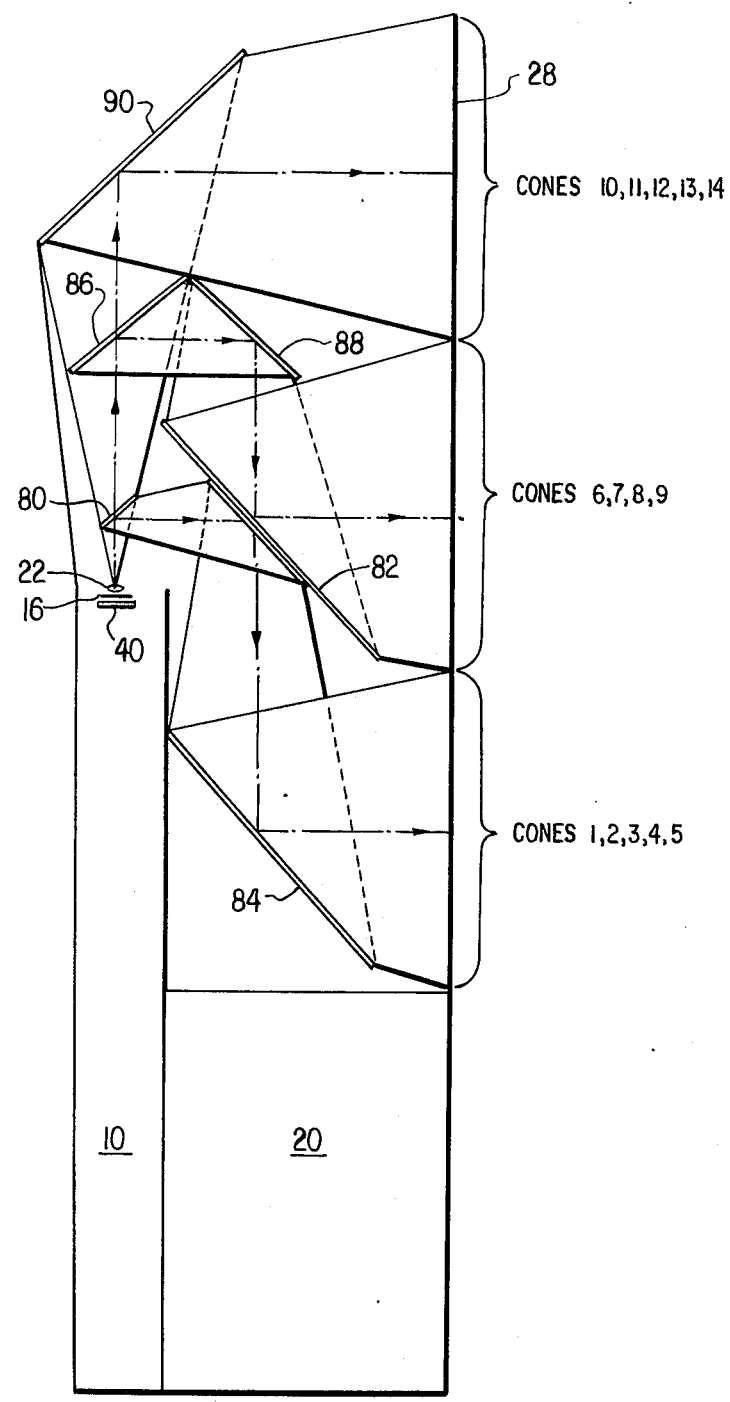

FIG. 14 is an enlarged cross-sectional view of the upper portion of the viewer of FIG. 13.

FIG. 15 is a partially schematic view illustrating a four-tier viewer.

FIG. 16 is an enlarged cross-sectional view of the upper portion of the viewer of FIG. 15, and illustrates the arrangement of folding mirrors.

Figure 17:
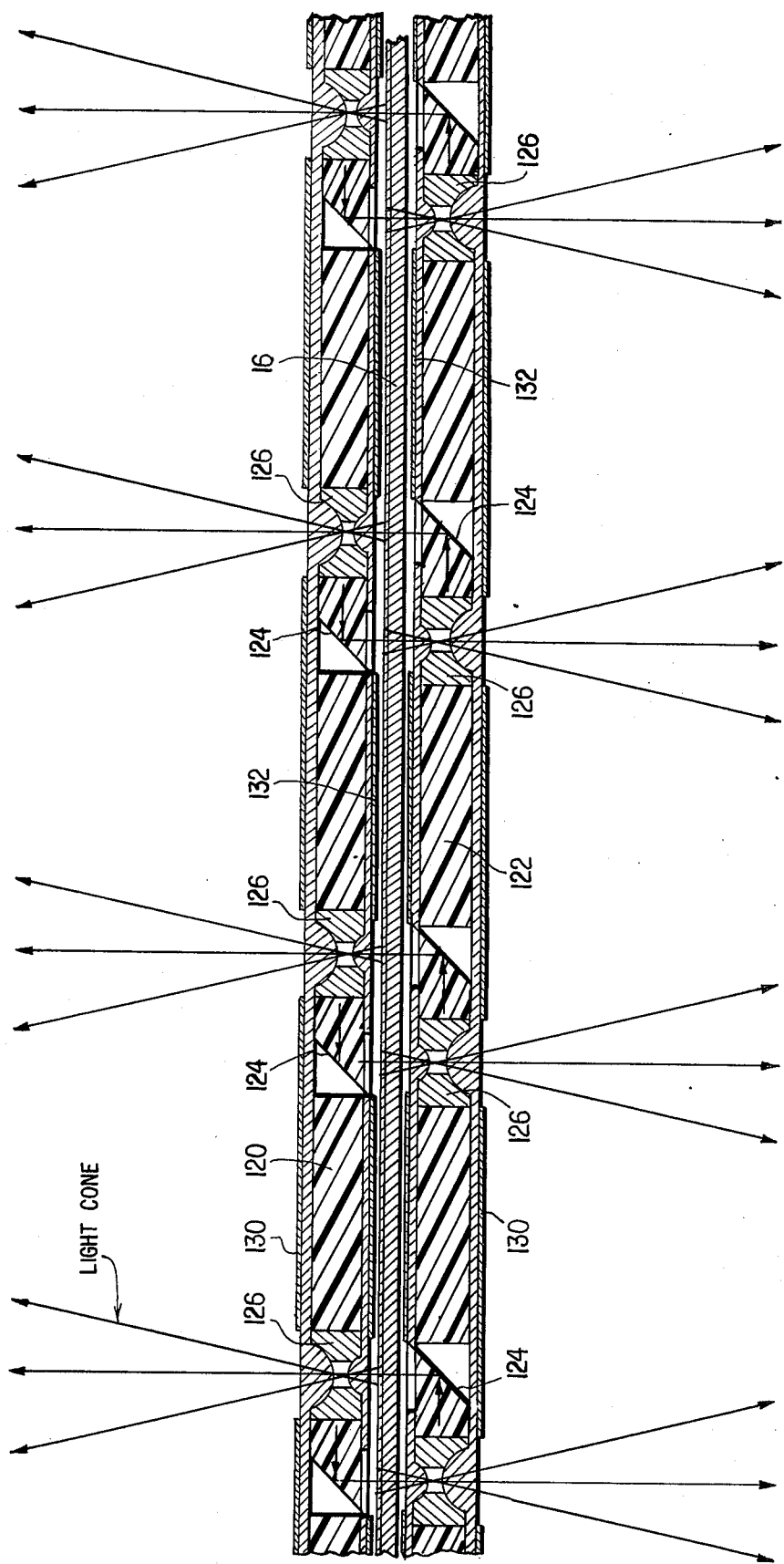

FIG. 17 is an enlarged view of the film strip lighting arrangement indicated within the circle 17 of FIG. 16.

Figure 18:
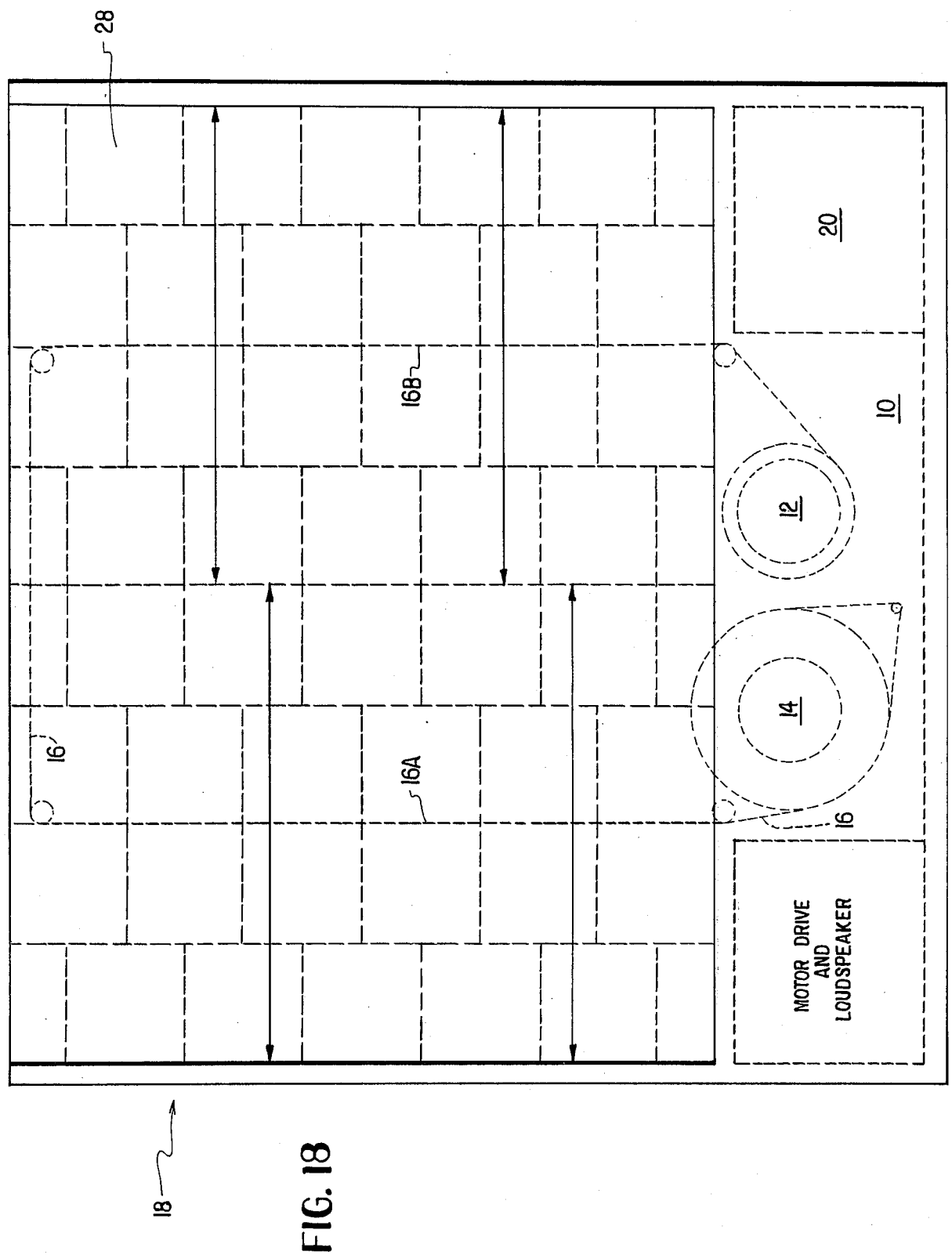

FIG. 18 is a partially schematic elevational view illustrating a large screen served by an extended film loop of a cassette.

Figure 19:
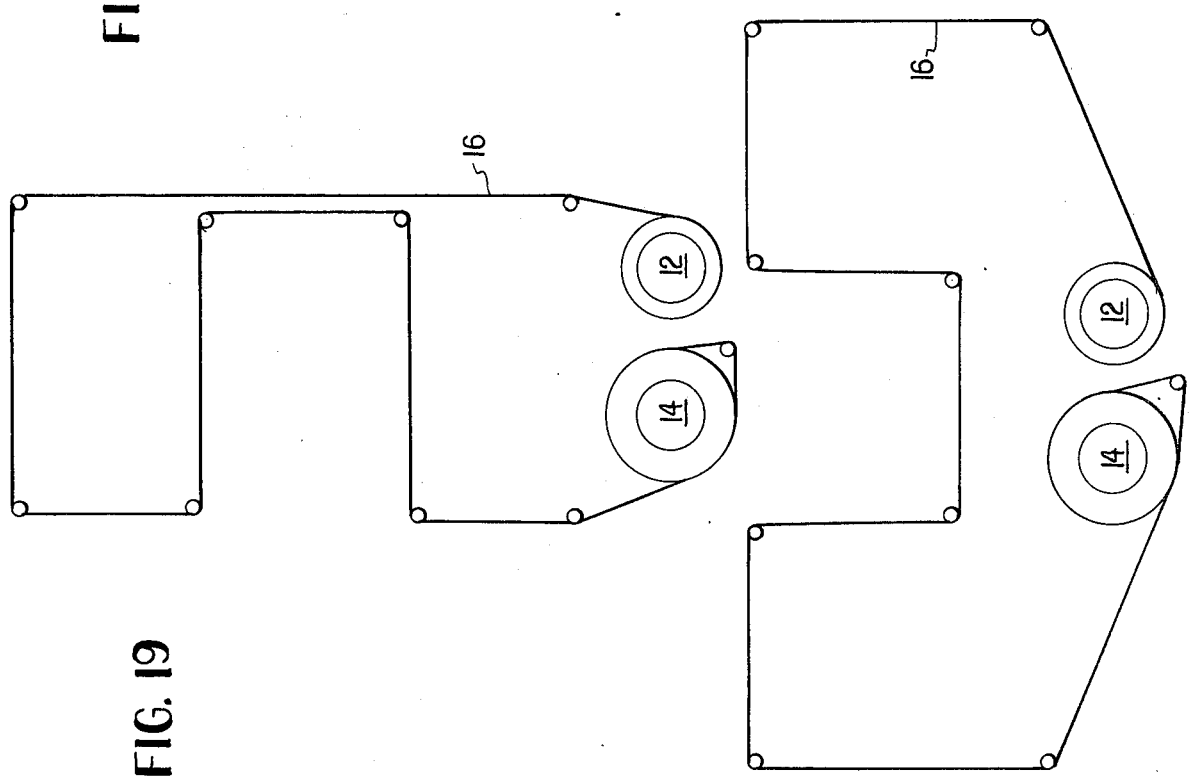

FIG. 19 illustrates two variants of multiple loops of cassette film, the loops servicing large area viewers.

Figure 20:
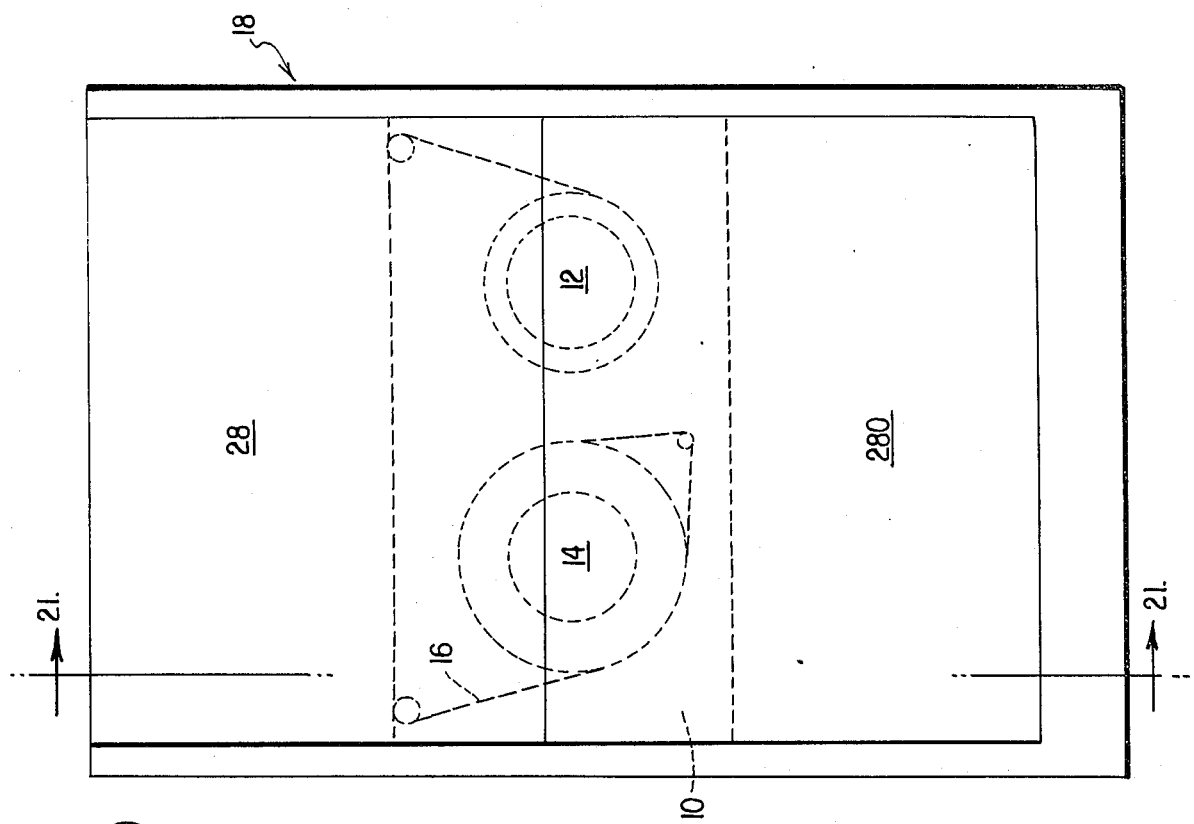

FIG. 20 is a partially schematic elevational view of a large area viewer for display of both motion pictures and still pictures.

FIG. 21 is a partially schematic cross-sectional view of the viewer of FIG. 20 along line 21—21.

FIG. 22(a) is a schematic plan view illustrating how black and white film is positioned in combination with color filters for yielding colored viewing, for a one-tier system.

FIG. 22(b) is a cross-section of FIG. 22(a) where certain color filters are positioned on top of the film.

FIG. 22(c) is a view similar to FIG. 22(b), except that the color filters are placed between the emulsion and the supporting base of the film.

Figure 23:
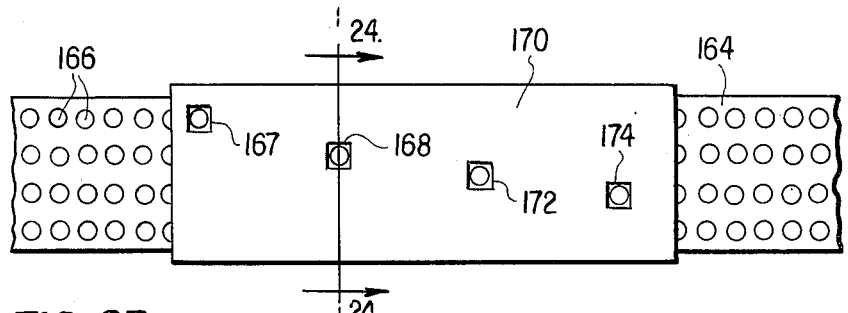
Figure 24:
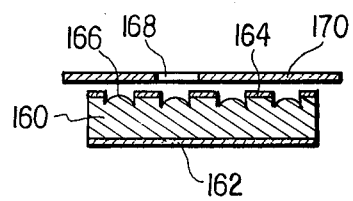
Figure 25:
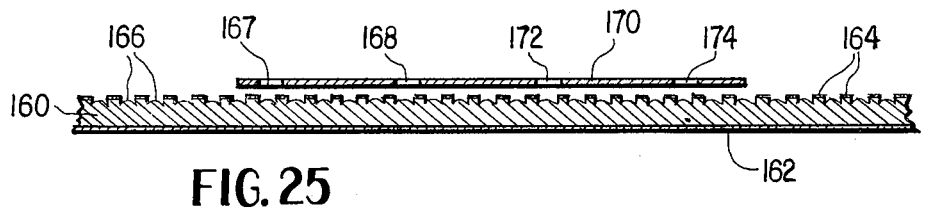

FIGS. 23-25 illustrate an embodiment wherein the film carries its own lenses.

Figure 26:
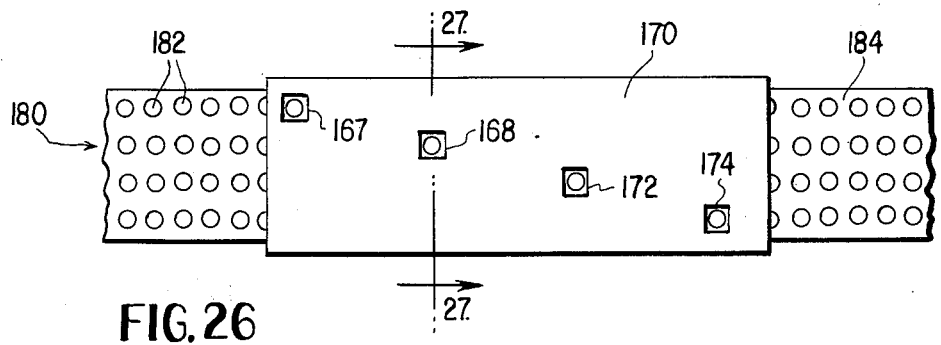
Figure 27:
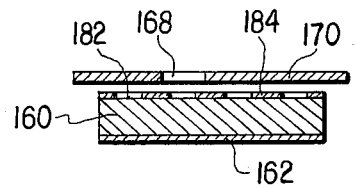
Figure 28:
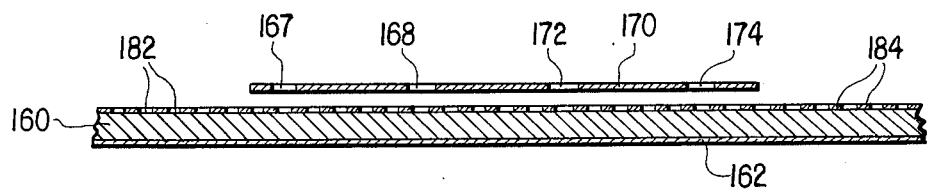

FIGS. 26-28 are similar to FIGS. 23-25 and illustrate another embodiment.

Figure 1:
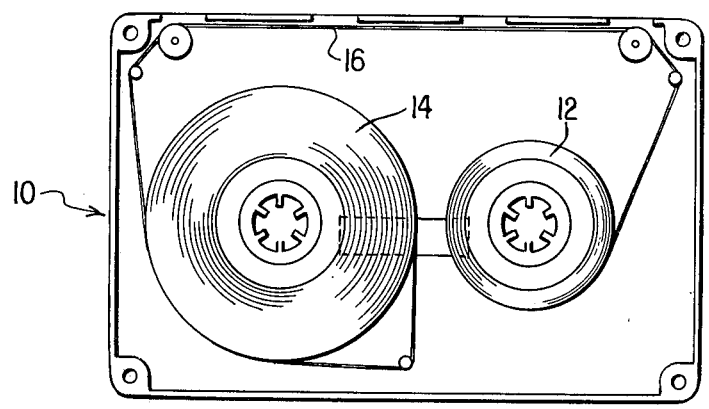
FIG. 1 is a perspective view indicating a typical Philips-type cassette.
Figure 3:
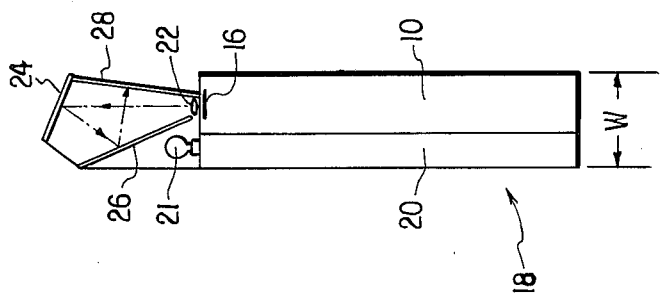
FIG. 3 is a view taken along section 3—3 of FIG. 2.

Referring now to the drawings, numeral 10 in FIG. 1 indicates generally a typical Philips-type cassette (Philips cassette) which includes two reels 12 and 14 carrying a thin film 16. One reel is the supply reel, the other the take-up reel. The two reels define a first plane, this being the plane containing the Philips cassette. Such cassettes are well known, a suitable drive dog engaging and rotating the take-up reel, the top run of the exposed film either recording or reading out by suitable transducers contiguous to it. At FIGS. 2 and 3, the numeral 18 denotes generally a compact optical viewer according to this invention and includes a Philips-type cassette 10, a battery denoted generally by the numeral 20, and a source of illumination denoted schematically by the numeral 21. Numeral 22 denotes any one of a plurality of mini lenses positioned along the top run of film 16. Numerals 24 and 26 denote first and second mirrors, respectively, and the numeral 28 denotes a rear projection viewing screen. This screen forms a second plane, the second plane being substantially parallel to the plane of the Philips cassette. The width of the viewer is denoted by W. Reference now to FIGS. 4(a) and 4(b) will illustrate the folding action of mirrors 24 and 26. At FIG. 4(a) a typical light cone emanating from a minilens 22 is illustrated as having a throwing distance L and an area on a projection screen having a diameter D and a half angle $\theta_c$. Reference now to FIG. 4(b) shows that such a light cone is folded by first impinging on mirror 24, then being reflected to second mirror 26 and thence projected onto read projection screen 28. The numerals 30 (FIG. 2) denote opaque septa between the lenses 22, the septa defining cells. The cells are denoted by the numerals 1, 2, 3 and 4. The septa also increase the mechanical strength of the recorder/viewer. The function of the septa shown at FIG. 2 is to prevent optical crosstalk between cells and also to limit the extent of the light cones. The septa thus establish imaginary zones on the viewing screen 28, the zones belonging to the cells such as cells 1, 2, 3 and 4.

Referring now to FIG. 5 of the drawings, the position of the several mini lenses 22 relative to the film is indicated by the dashed circles, the designation $W_1$ indicates the width of individual stored information areas on film 16 and $W_m$ indicates the width of the track associated with each lens.

In the case of a typical Philips-type cassette, the width of the film 16 is approximately 150 mils. For the system illustrated in FIGS. 2 and 3, the number of lenses N = 4 and the width of the mirrors required for illumination s $W_m$ = 150/4 = 37.5 mils. The lighting may be derived from either a single strip such as shown in my prior U.S. Pat. No. 3,864,034 or by a lighting plate such as shown in the L. W. Grunberger co-pending application Ser. No. 536,409, filed Dec. 26, 1974, entitled "Point Array Sheet Lighting Apparatus," commonly assigned, hereby incorporated by reference, and referred to hereafter as a Grunberger sheet or Grunberger plate. As shown in this patent application, a Grunberger sheet is a sheet of transparent material coated on both faces so as to totally internally reflect light fed into an edge of the sheet in a direction more or less in the plane of the sheet. An array of small reflecting surfaces within the sheet intercepts the light, each reflector of the array directing its portion of the light normally out of the sheet.

Referring not to FIGS. 6-8, an embodiment is illustrated employing a double tier array. Referring now to FIG. 6 of the drawings, the numerals 1, 2, 3 and 4 denote open-ended cells in the lower portion of rear projection viewing screen 28. The numerals 5-9 indicate corresponding cells in the upper screen portion. The cells may be regarded as the intersection of the light cones (which are projected through lenses 12 and strike the mirrors) and the viewing screen. Referring now to FIG. 7 of the drawings, the numeral 40 denotes a lighting strip immediately below the film. Any source of illumination which yields point sources of light for illuminating the microimages on film strip 16 may be employed. It will be understood that except for the number of folding mirrors which generate the several light cones, the construction of FIG. 6 is otherwise similar to that of FIG. 2.

The numerals 42, 44 and 46 denote a plurality of mirrors which fold the light cones corresponding to zones 1, 2, 3 and 4. The numeral 48 denotes a mirror for folding or bending light cones corresponding to zones 5, 6, 7, 8 and 9 on screen 28. Reference to FIG. 8 of the drawings illustrates in more detail the action of the folding mirrors shown at FIG. 7. The mirrors 42 and 44 are staggered along the length of the viewing device 18 with respect to the mirror 48. This may be seen by reference to the righthand portion of FIG. 8 where the vinculum at the lower portion of the screen corresponds to the light cones 1–4, while the vinculum at the upper portion of screen 28 corresponds to light cones 5–9. FIG. 8(a) further illustrates the staggered arrangement. It will be observed that mirror 46 need not be discontinuous, although pairs of mirrors 42, 44 are discontinuous.

FIG. 9 illustrates an embodiment of FIG. 6, the difference being that instead of the mirror arrangement on FIG. 8, an arrangement somewhat similar to that of FIG. 4 is employed. Thus, mirrors 24 and 26 fold the light corresponding to lower screen cones 1–4, while mirror 50 folds light cones 5–9 for viewing on the upper portion of screen 28.

Referring now to FIG. 10 of the drawings, still another folding mirror embodiment useful in the construction of FIG. 6 is illustrated. In the embodiment of FIG. 10, a two-tier construction such as FIG. 6 has shown, with the lower tier light cones 1–4 undergoing three folding or reflecting actions by mirrors 54, 56 and 58. Mirrors 60 accommodate the single folding action of cones 5–9. Again, the mirrors 54, 56 and 58 for the lower tier light cones are staggered along the length of the viewer 18 with respect to mirrors 60.

Referring now to FIG. 11 of the drawings, a film lighting embodiment is illustrated which may be employed in a system such as illustrated in FIG. 10. The numeral 16 again denotes the film strip of a Philips-type cassette and is defined by a transparent base carrying a photographic emulsion with microimages therein. A Grunberger sheet of the type previously described carries one set of reflectors which serve to generate light cones for the sectors 5–9 of the viewing screen while another set of reflectors in the Grunberger sheet generate light cones 1–4. The numeral 66 denotes a plate formed of a transparent, rigid plastic such as methylmethacrylate and includes an opaque aperture plate 68 having apertures therein which define with plastic of plate 66 mini lenses 70. An integral extension 71 adjacent those lenses 70 corresponding to optical cones 1–4 each carry a reflecting surface 74. Reflector 74 corresponds to reflector 54 of the embodiment of FIG. 10. If desired, the lighting arrangement may be used without the extension 71.

FIG. 12 is similar to FIG. 5 and illustrates the relative staggered locations of the mini lens relative to the nine tracks on the film for an embodiment similar to FIG. 6 and employing the lighting construction of FIG. 11. Note that each of the nine tracks on the film strip correspond to one light cone.

Referring now to FIGS. 13 and 14 of the drawings, an embodiment is illustrated which employs three tiers of reflectors to bend or fold light cones from film strip 16. As before, the numeral 40 denotes generally any device for generating a plurality of point sources of illumination while the numeral 22 denotes in general a typical mini lens. The lower tier of light cones bears the numerals 1–5 at FIG. 13, the middle tier bears the numerals 6–9 while the upper tier bears the numerals 10–14. The reader will note that the bottom tier is below the active portion of the film strip 16. The system shown in FIGS. 13 and 14 displays an advantage over those previously described in that larger viewing screens 28 are possible using a standard Philips-type cassette. For example, a viewing screen of 3 × 4 in. is possible. In FIG. 14, the numerals 80, 82 and 84 represent folding mirrors for accommodating lower tier light cones 1–5, and mirrors 86, 88 and the second silvered surface of mirror 82 accommodates folding of the middle tier cones 6–9. A single reflecting surface 90 accommodates the upper tier cones 10–14. Typically, the mirrors for accommodating the lower and upper tier of light cones are aligned along the length of viewer 18, while reflectors 86, 88 and 82 are staggered with respect to them. This may be seen by reference to FIG. 13 wherein the middle tier cones are shown as displaced from those in the upper and lower tiers.

In a construction such as shown in FIGS. 13 and 14, there are a relatively large number of optical tracks, being a total of fifteen if an optical sound track is included. Accordingly, the width of film 16 will be approximately 10 mils. In order to magnify a portion of such a narrow track into a square of approximately 1 × 1 in., a magnification of the order of 100 is required if redundancy or overlap of the light cones as projected on screen 28 obtains.

For lenses 22 of a double convex construction having a radius of curvature of 1/32 of an inch, a focal length of 31 mils and a throwing distance of 3.1 inches obtains. With these parameters the thickness of a viewer 18 of such a three-tier system is approximately 1 inch. If, instead of a Philips-type cassette film 16 of width approximately 150 mils, an eight-track cassette having a film width of 300 mils is employed, then larger diameter lenses 22 may be used. This follows from the fact that the individual track width is approximately 20 mils.

Referring now to FIGS. 15 and 16 of the drawings, a four-tier system of nesting cones is illustrated, the viewer 18 again using the standard Philips-type cassette. The screen 28 may, with this construction, typically, be of dimensions 4 in. × 5 in. Again, the bases of the light cones are indicated by numerals 1–9 where they intersect the rear projection viewing screen. In this construction, the filmstrip 16 is taken farther out of the cassette and positioned half-way up the screen and midway between the two middle rows or tiers. The upper row elements bear a designation 5′–9′, while the lowermost row elements carry the designation 5–9. Innermost rows 1′–4′ and 1–4 are similarly labeled. FIG. 16 indicates the folding of the light cones by several reflecting surfaces. Uppermost reflectors 94 and 96 are staggered relative to reflector 98, while lowermost reflectors 100 and 102 are, similarly, staggered with respect to reflector 104. The arrangement is similar to that of the embodiment of FIGS. 6–8(a). In essence, the construction of FIGS. 15 and 16 employs the projection in two directions from film 16. Accordingly, a two-sided lighting strip must be employed, with light coming from the top downwards for light cones 1–9 and from the bottom upwards for light cones 1′–9′. Further, there are two strips of lenses, one above film strip 16 and one below film strip 16. These details are shown as FIG. 17 wherein it is seen that the cassette film 16 is sandwiched by two Grunberger lighting plates, the sandwich denoted by the numeral 17.

Referring now to FIG. 17, such an arrangement for projection from both sides of film 16 is shown. The numeral 16 denotes the cassette film which is sandwiched by an upper Grunberger type lighting plate 120 and a similar lower plate 122, this being the sandwich 17 of FIG. 16. Each lighting plate carries a plurality of reflectors 124 at regularly dispersed locations over its area for the purpose of projecting light orthogonally out of the lighting plate, in a manner shown in the noted Grunberger application. Additionally, each lighting plate carries a plurality of mini lenses 126. The distribution of mini lenses and the reflectors 124 over the lighting plates 120 and 122 is such that light projected downwardly out of upper plate 120 by its reflectors 124 passes through the film 16 (and microimages thereon) and thence downward to lenses 126 on the lower lighting plate 122. The same action takes place with respect to light projected upwardly from lower lighting plate 122. The short arrows at each reflector 124 further illustrate the action. Opaque coatings 130 and 132 on the top and bottom surfaces of the Grunberger lighting plates 120 and 122 are interrupted at regions adjacent the refectors and lenses.

In operation the cassette film 16 is indexed so as to assume discrete positions for each scene projected on the viewing screen. The upper half of the viewing screen is filled by light from cones projected upwardly through the microimages associated with lower reflectors 124 and upper lenses 126. The lower half of the viewing screen is filled by light from cones projected downwardly through the microimages associated with upper refectors 124 carried by plate 120 and lower lenses 126 carried by plate 120.

Referring now to FIG. 18 of the drawings, a construction is indicated wherein a relatively large viewing screen may be employed. For example, a screen of a dimension 6 × 8 in. is possible with this construction. A detailed description of the viewer 18 will now be given, the reader will readily recognize that several rows of cells, indicated by the dashed lines on viewing screen 28, are staggered. A first run 16A of film strip 16 of cassette 10 is used to generate two tiers or rows on either side thereof. Similarly, run 16B of strip 16 is used to generate two tiers on either side thereof, making a total of four tiers on the left served by another film strip portion. In this construction, the three portions of the film strip, namely, 16A, 16B and the passive section at the top of FIG. 18 are subject to serious environment fluctuations such as temperature, humidity, and creepage. Thus, accurate registry must be maintained over a distance of about 14 inches. This can be achieved only by having considerable play or tolerance in the information and lighting.

FIG. 19 illustrates two other examples, similar to the construction of FIG. 18, wherein multiple looping of the film 16 for a large area viewer is achieved. Both sides of the active runs of the loops are employed to generate light cones.

Referring now to FIGS. 20 and 21, another modification is illustrated which combines a screen 28 which receives the light cone output from a typical Philips-type cassette 10 having a film 16, with a screen 280 which receives a light output from an optical viewer such as described in my noted co-pending application Ser. No. 612,862, filed Sept. 12, 1975 and entitled "Compact Folded Mirror Recorder and Viewer of Information." The upper screen 28 is adapted to display motion picture, while the lower screen 280 is adapted to display still scenes.

Referring now to FIGS. 22(a), 22(b) and 22(c), the use of color filters for each of a triad of mini lenses is illustrated, there being one such triad for each track of the film strip. Thus, one triad services cone 1, another triad services cone 2, and so on. The use of color filters in combination with black and white film to produce colored images on a viewing screen is illustrated in my U.S. Pat. No. 3,824,609, entitled "Color Micro Optic Apparatus." Each triad is defined by three lenses each having a primary color filter, such as red, green, and blue. Alternately, as shown at FIGS. 22(b) and 22(c), the color filters (in the form of strips) may be on the top surface of the film, or, FIG. 22(c), between the emulsion and substrate. The manner of using black and white film to take and project out color scenes is the same as that described in my noted U.S. Pat. No. 3,824,609 patent. The term triad is intended to embrace, in the claims, any plurality of lenses and associated color filters which are substituted for a single lens such as 22 of FIG. 5 and which services a single film track, i.e., corresponding to a single light cone.

In the fabrication of viewing devices of the types shown in the preceding figures, it should be noted that there is a need to match the materials of the lighting strip, the lens strip, and the cassette film in order to preserve dimensional integrity or stability of the optical system. Thus, if these several elements are all made of the same material, and if the entire reader is subject to temperature or humidity fluctuations, it is clearly important that dimensional changes will be held to a minimum if these important elements are all fashioned of the same material. In this manner, they will all either expand or will all contract at the same unit rate. The use of fiducial marks on the film strip may also be employed to maintain optical integrity, as known in the optic art. The use of non-planar mirrors, in lieu of the illustrated planar mirrors, to compensate for lens abberations is also comprehended by this invention.

Changes of the film 16 along its length relative to the change in distance between the projection lenses will, ordinarily, result in the appearance of bands on the screen between the projected light cones. This may be prevented in the recording state by redundancy. That is to say, if there is an overlap, purposely given, through the light cones upon their intersection with the viewing screen, then upon relative changes between the distance between the projection lenses and the dimensional change of the film, the eye will not notice the difference. The reason for this is that the human eye, being imperfect, cannot resolve better than about 150 lines per inch, i.e., 6 mils.

Referring now to FIGS. 23, 24 and 25 of the drawings, an embodiment is illustrated wherein the cassette tape is itself provided with lenses. The numeral 160 denotes a transparent substrate or base of the tape provided on its bottom surface with a photographic emulsion 162. The numeral 164 denotes an opaque coating over the upper surface of the film strip except at portions corresponding to lensettes 166. These lensettes are similar to those described in my U.S. Pat. No. 3,864,034, although they need not be significantly lower than the top surface of the film, as shown. The numeral 168 denotes one of four openings in coarse mask 170, the mask in turn mounted on and carried by the frame of the apparatus. In operation, the mask 170 is positioned on a viewer and camera apparatus such as that shown in FIGS. 1 and 2 of the drawings, with the film strip 160 replacing the film strip denoted by the numeral 16 in those figures. The lenses 22 in those figures are effectively replaced by the lensettes 166 on the film strip in combination with the openings in opaque mask 170. The mode of operation is otherwise the same, both in the recording and viewing stages.

Referring to FIG. 23 in particular, the reader will note the staggering of openings 167, 168, 172 and 174 in coarse mask 170. The reader will immediately recognize that the openings in the coarse mask are positioned in a manner similar to the positioning of the lenses 22 illustrated at FIG. 5 of the drawings. The lensettes 166 may be embossed on the top surface of the substrate 160 and then opaque coating 164 applied in any convenient and known manner. Those lenses 166 beneath mask 170 which are not in optical alignment with a mask opening are inactive (play no role) until they are thus aligned. Hence, the lenses 22 and the mask openings aligned with a lens 166 are termed active.

Referring now to FIGS. 26, 27 and 28 of the drawings, another embodiment is illustrated similar to that described with respect to FIGS. 23-25. In this embodiment, the film strip also carries the lenses. The numeral 180 denotes in general yet another film strip whose substrate is again denoted by the numeral 160 and an emulsion on the bottom surface thereof also denoted by the numeral 162. Similarly, the numeral 168 denotes an opening in an opaque mask 170, the remainder of the openings in the mask again being denoted by the numerals 167, 172 and 174. The essential difference between this and the previously-described embodiment resides in the form of the lens elements carried by the film strip. The lens elements are here defined by pinholes 182 in opaque coating 184 on the top of the film strip. The coating 184 is entirely similar to coating 164 in the previously-described embodiment. As noted in my co-pending application Ser. No. 474,795, filed May 30, 1974, entitled "Pinhole Microfiche Camera," hereby incorporated by reference, a pinhole may perform the same function as a conventional lens in certain applications.

It will be apparent that any of the devices of this invention may be used for recording as well as for projecting. Recording may be carried out by, for example, either of two methods. A transparency may be placed directly on the viewing screen and illuminated from the rear. Light passing now in the reverse direction through the apparatus falls on virgin film, the film being advanced by indexing for each new exposure. Another method is to optically project, in sequence, the scenes to be recorded onto the screen. Again, the film is indexed after each exposure.

What is claimed is:

1. A compact optical device including,
    (a) a cassette film, having a width substantially less than its length, and having its ends wound upon spools,
    (b) a run of said film, between the two spools, a plurality of active lenses associated with said run, said active lenses being distributed across the width of the film and being spaced from each other longitudinally of said run such that each active lens corresponds to a portion of the width of the film, the optic axes of the lenses being at right angles to the plane of the run of film,
    (c) means for illuminating and projecting portions of said run adjacent said lenses, whereby projected light in the form of cones passes through the film and through the lenses,
    (d) a rear projection viewing screen for receiving an image,
    (e) means for folding said projected light cones to effectively shorten the distance between the said film and the said rear projection screen.

2. The optical device of claim 1 wherein said lenses are of a radius of between 10 and 150 mils.

3. The optical device of claim 2 wherein said (e) means for folding light includes a plurality of mirrors disposed so that their surfaces make an angle of less than 90 degrees with the surface of the said film, whereby the light is reflected at least once by the mirrors.

4. The optical device of claim 3 wherein said screen receives a projected image defined by at least two parallel, touching rows of light cone base termini.

5. The optical device of claim 4 wherein said (c) means for illuminating portions of said run is defined by a Grunberger sheet, each said Grunberger sheet comprising a sheet of transparent material coated on both faces so as to totally internally reflect light fed into an edge of the sheet in a direction generally in the plane of the sheet, the sheet further including an array of small reflecting surfaces within the sheet which reflecting surfaces intercept such light, each reflector of the array directing its respective portion of the light normally out of the sheet.

6. The optical device of claim 4 wherein the distance between the lenses and one row of light cone base termini is different than the distance between the lenses and the other row of light cone base termini.

7. The optical device of claim 3 wherein said (c) means for illuminating the film run portions illuminates both sides of the film, and wherein both sides of the film are associated with said lenses, whereby two sets of light cones are generated, one set emanating from each side of the film.

8. The optical device of claim 1 wherein said (c) means includes means for sequentially projecting images to thereby generate animated scenes on the viewing screen.

9. The optical device of claim 1 wherein said film carries microimages, sub-sets of said microimages each defining a macroscene when projected on said viewing screen, the microimages corresponding to a single macroscene being spaced from each other widthwise across the film by a distance equal to the diameter of the microimages.

10. The compact optical device of claim 1 wherein the area of said viewing screen is at least 10 times the area of the film.

11. The compact optical device of claim 1 wherein the width of said film is at least five times smaller than the height of said screen.

12. The compact optical device of claim 1 wherein the magnification is the same for the light projected through each said lens onto said screen.

13. The optical device of claim 1 wherein each of said lenses is defined by a triad of lenses, each lens of each triad associated with a color filter and being in optical alignment therewith, whereby color projection using only black and white film is achieved.

14. The compact optical device of claim 1 wherein said film carries a plurality of lenses on a surface thereof and wherein the active lenses are defined by the apertures of an opaque mask parallel and contiguous to said run, said apertures being each in optical alignment with one lens on the film.

15. The optical device of claim 14 wherein said lenses on the film are embossed thereon and are separated by an opaque, inter-lens coating.

16. The optical device of claim 14 wherein said lenses carried by the film are pinhole lenses.

17. The compact optical device of claim 1 including means for limiting the extent of the projected light cones, to thereby prevent optical cross-talk.

18. An apparatus for illuminating both sides of a film carrying microimages thereon, to thereby project light cones out from both sides of the film, including,
   (a) a pair of Grunberger lighting sheets sandwiching said film, each said Grunberger sheet comprising a sheet of transparent material coated on both faces so as to totally internally reflect light fed into an edge of the sheet in a direction generally in the plane of the sheet, the sheet further including an array of small reflecting surfaces within the sheet which reflecting surfaces intercept such light, each reflector of the array directing its respective portion of the light normally out of the sheet,
   (b) each Grunberger sheet carrying a lens at a location over its plane which is in optical alignment with a reflector in the other Grunberger sheet, the reflectors in each Grunberger sheet reflecting light in a direction toward the other Grunberger sheet.

19. An apparatus for recording microimages on a film strip, including,
   (a) a pair of Grunberger lighting sheets sandwiching said film, each said Grunberger sheet comprising a sheet of transparent material coated on both faces so as to totally internally reflect light fed into an edge of the sheet in a direction generally in the plane of the sheet, the sheet further including an array of small reflecting surfaces within the sheet which reflecting surfaces intercept such light, each reflector of the array directing its respective portion of the light normally out of the sheet,
   (b) each Grunberger sheet carrying a lens at a location over its plane which is in optical alignment with a reflector in the other Grunberger sheet, whereby macroscenes projected through the lenses on both sides of the sandwich are recorded on the film strip.

20. A compact optical device including,
   (a) a cassette, film,
   (b) a run of said film, a plurality of lenses associated with said run, said lenses being distributed across the width of the film and being spaced from each other longitudinally of said run such that each lens corresponds to a portion of the width of the film, the optic axes of the lenses being at right angles to the plane of the run of film,
   (c) an image screen substantially orthogonal to said film run for receiving macroscenes,
   (d) means for folding light projected through said image screen, through said lenses, and onto said film run, to thereby define microimages on the film run.

21. The compact optical device of claim 20 including means for limiting the extent of the projected light cones, to thereby prevent optical cross-talk.

* * * * *